Nov. 26, 1957   N. C. FULMER   2,814,712
SOLDERING TOOL

Filed Sept. 20, 1951   3 Sheets-Sheet 1

INVENTOR.
Norman C. Fulmer

Nov. 26, 1957 — N. C. FULMER — 2,814,712
SOLDERING TOOL
Filed Sept. 20, 1951 — 3 Sheets-Sheet 2
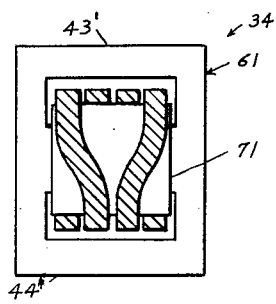
Fig. 4
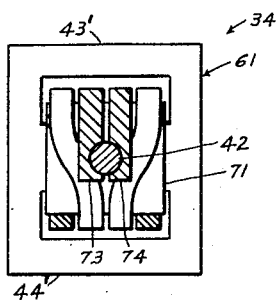
Fig. 5
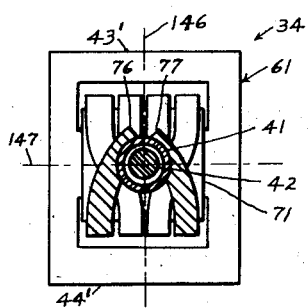
Fig. 6
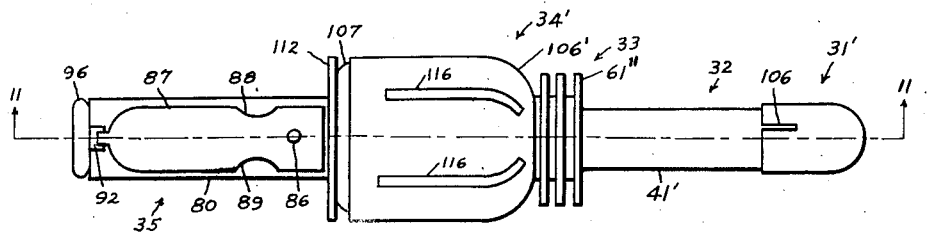
Fig. 10
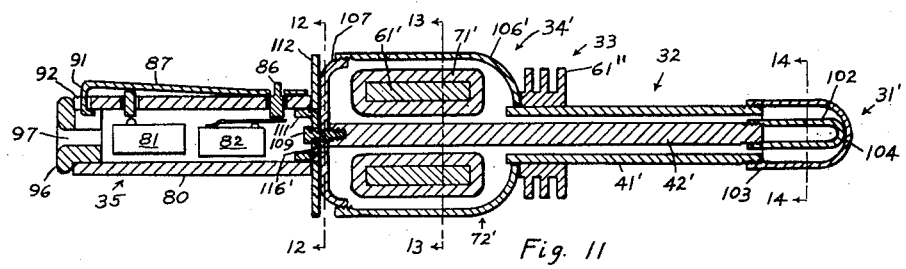
Fig. 11
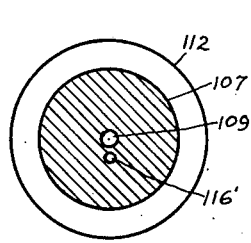
Fig. 12
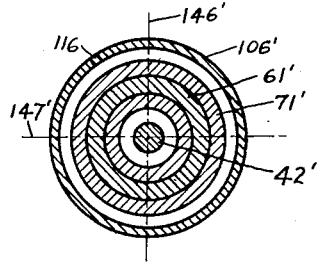
Fig. 13
Fig. 14
INVENTOR.
Norman C. Fulmer

INVENTOR.

Norman C. Fulmer

United States Patent Office 2,814,712
Patented Nov. 26, 1957

2,814,712

SOLDERING TOOL

Norman C. Fulmer, Pearl River, N. Y.

Application September 20, 1951, Serial No. 247,498

13 Claims. (Cl. 219—26)

This invention relates to electrically heated apparatus, and more particularly to a soldering tool wherein a working tip is heated by electric current.

The invention utilizes a transformer which functions to convert a relatively high-voltage, low-current power into a relatively low-voltage, high-current power. The high-current power is produced in a secondary winding which must necessarily be made of a conductor having a relatively large cross-sectional area in order to conduct the current with sufficiently low losses.

In such devices constructed heretofore, this necessity for a large-conductor secondary has resulted in a structure with which certain compromises had to be made. For example, the output connections of the secondary winding could not conveniently be made at a geometrical axis of the transformer. As a result, it has been difficult to construct the soldering tip in axial alignment with the transformer. Heretofore, therefore, such devices have not generally been constructed to have a handle, a transformer, and a working tip arranged in alignment along a common straight axis.

An object of the present invention is to provide a soldering tool having a handle, a transformer, and a working tip arranged in alignment along a common straight axis.

A further object is to provide a transformer having a secondary winding which is compact and geometrically balanced.

Another object is to provide a soldering tool which is relatively immune to becoming accidentally short-circuited.

A further object is to provide a soldering tool having a handle which, when gripped, actuates a switch to turn on electric current.

A still further object is to provide an electric soldering tool having incorporated therein switching devices by means of which different amounts of heat may conveniently be produced in a working tip.

Another object is to provide a soldering tool having a working tip that is easily replaceable.

Still another object is to provide an electric soldering tool having a working tip in which molten solder forms a path for electric current.

Further objects are to provide a soldering tool that is durable, simple to construct, compact, and efficient.

In order to more fully understand the accomplishments of the present invention, it should be mentioned that soldering is essentially a "thrusting" or "jabbing" operation; the desideratum is to manually guide the working tip to a desired place. Such a feat is often the most easily accomplished if the handle and working tip are positioned in alignment upon a common straight axis. This has been exemplified for centuries, in the form of knives and swords, where the same purpose exists, namely to manually guide a tip to a desired place.

Other objects of the invention will be apparent from the specification and drawing, in which:

Figure 4 is a cross-sectional view taken on the line 4—4 of Figure 3;

Figure 5 is a cross-sectional view taken on the line 5—5 of Figure 3;

Figure 6 is a cross-sectional view taken on the line 6—6 of Figure 3;

Figure 10 shows an exterior view of an alternative embodiment of the invention;

Figure 11 is a longitudinal sectional view taken on the line 11—11 of Figure 10;

Figure 12 is a cross-sectional view taken on the line 12—12 of Figure 11;

Figure 13 is a cross-sectional view taken on the line 13—13 of Figure 11;

Figure 14 is a cross-sectional view taken on the line 14—14 of Figure 11;

Figure 20:
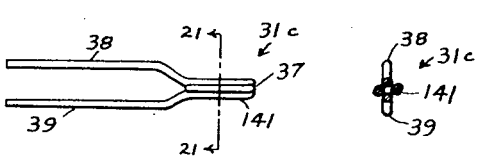
Figure 21:
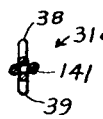

Figures 17, 18, 19, and 20 show alternative forms of preferred working tips of the invention;

Figure 21 is a cross-sectional view taken on the line 21—21 of Figure 20.

The novel soldering tool comprises a working tip 31, a current-conductor 32, a heat radiator 33, a transformer 34, a handle 35, and a power cord and plug assembly 36.

Figure 1:
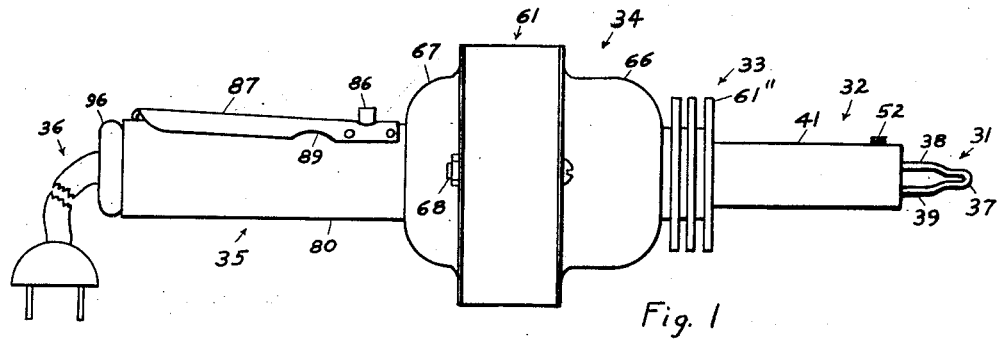
Figure 1 shows a side elevational exterior view of a preferred embodiment of the novel soldering tool.
Figure 2:
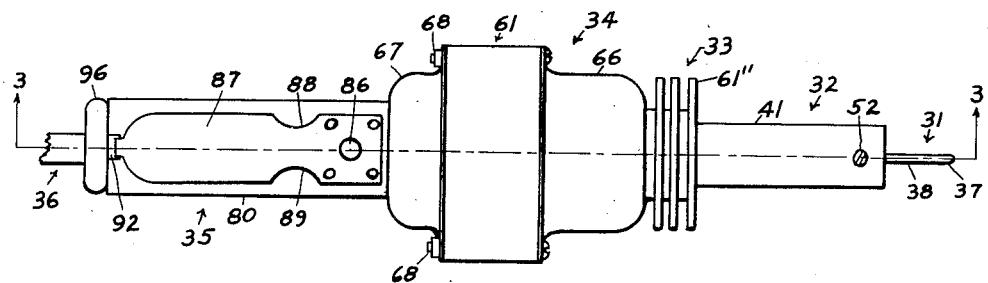
Figure 2 is a top plan view of the device of Figure 1.
Figure 3:
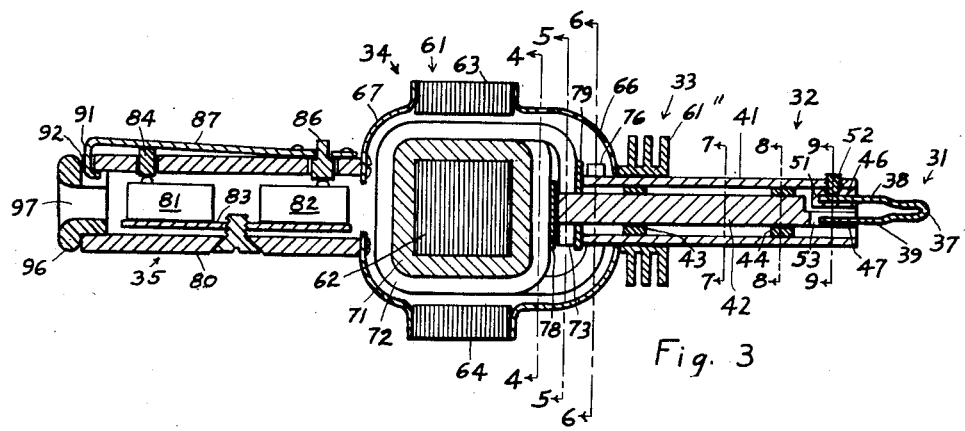
Figure 3 is a side sectional view taken on the line 3—3 of Figure 2 and shows the disposition of internal components.

A preferred form of the working tip 31, shown in Figures 1, 2, and 3, may be formed from a conductive material, such as No. 12 copper wire, shaped in the general form of a U-loop, the apex 37 thereof being tightly bent so that portions of the tip in the vicinity of the apex 37 are closely mutually adjacent. The parallel legs 38, 39 of the U-shaped tip are suitably spaced apart for attachment to the electrical conductor 32, as is described hereinafter.

The electrical conductor 32 comprises an outer conductor 41 and an inner conductor 42. These conductors are preferably made from an electrically-conductive material such as copper or aluminum, and are coaxially arranged. Suitable material for the outer conductor 41 has been found to be copper tubing having an inside diameter of three-eighths of an inch and a length of about three to eight inches. Suitable material for the inner conductor 42 has been found to be round copper rod having a diameter of five-sixteenths of an inch. Insulative spacers 43 and 44 may be positioned to maintain the conductors 41 and 42 in spaced relationship.

Figures 7, 8, 9:
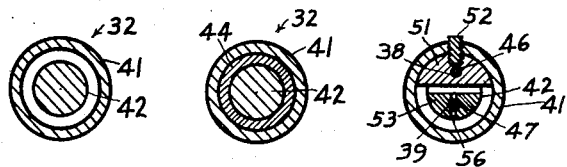
Figure 7 is a cross-sectional view taken on the line 7—7 of Figure 3.
Figure 8 is a cross-sectional view taken on the line 8—8 of Figure 3.
Figure 9 is a cross-sectional view taken on the line 9—9 of Figure 3.

As shown in Figures 3 and 9, receptacle openings 46 and 47 are provided in the outer and inner conductors 41 and 42 respectively, which receive the legs 38 and 39 of the working tip 31 and provide electrical contact and mechanical support therefor. A receptacle member 51, having a generally half-round shape, is affixed to the inner surface of the outer conductor 41 near the outer end thereof, by a convenient means such as soldering, welding, brazing, or screwing. The tip receptacle 46 is provided in the member 51 in longitudinal alignment with the conductor 32, and is made sufficiently large to receive the leg 38 of the tip 31. A set screw 52 is threaded through the outer conductor 41 and receptacle member 51, so as to securely engage against the leg 38 of the tip 31.

The outer end of the inner conductor 42 is provided with a substantially half-rounded shoulder 53 shaped to substantially conform to the space bounded by the receptacle member 51 and the outer end portion of the outer conductor 41. The inner conductor 42 and shoulder 53 must be electrically insulated from the outer conductor 41 and receptacle member 51. The tip receptacle opening 47 is positioned in the shoulder 53 in longitudinal alignment with the conductor member 32, and is of such a diameter that the shoulder 53 will electrically and mechanically grip the leg 39 of the tip 31; a slit 56 is provided in the shoulder 53 in axial alignment with and through the receptacle opening 47 and functions to divide, longitudinally, a portion of the shoulder 53 and thus permits a resilient gripping action between the shoulder 53 and the leg 39.

The radiator 33 is preferably made from material having good heat conductivity, such as copper, and comprises fins 61″. The radiator is attached to the conductor 32 by a method giving good heat-conductivity such as by soldering or shrink-fitting, or with a set-screw. The radiator 33 functions to cool the conductor 32 and transformer 34. Where such cooling is not desired, the radiator may be omitted.

The transformer 34 comprises a core 61 of magnetic-responsive material such as iron which preferably is of a style known in the art as a "shell-type" core having a center leg 62 and outer legs 63 and 64. Alternatively, other types of cores may be employed, such as the "core-type" or the cylindrical type described hereinafter. A suitable shell-type core may have a leg 62 measuring, for instance, three-fourths of an inch wide, three-fourths of an inch thick, and one and one-eighth inches long. The core 61 is supported by a front frame 66 and a rear frame 67; the frames may be fastened to the core by means of screws 68. The front frame 66 may be attached to the radiator 33 or conductor 32 by any convenient means, such as soldering or screwing.

A primary winding 71 which may comprise, for example, approximately 500 turns of No. 24 copper wire, is positioned on the center leg 62 of the core 61. A secondary winding 72 is positioned on and around the primary winding 71. The secondary winding 72 is preferably constructed from two pieces of copper or aluminum bar each having cross-sectional dimensions of one-fourth of an inch by one-eighth of an inch. Half-round notches, having the same radius as does the inner conductor 42, are provided in the sides of each of the bars near inner ends 73, 74 thereof. The bars are positioned mutually adjacent and side-by-side in the vicinity of their inner ends 73, 74 so that the half-rounded notches form a circular receptacle into which the inner end of the inner conductor 42 is inserted and fastened by soldering or other means.

The secondary winding 72 is constructed and positioned as follows (refer to Figures 3, 4, 5, and 6): The inner conductor 42 is placed in geometric axial alignment with the core 43′ so that the inner ends 73, 74 of the bars are spaced about one-fourth of an inch away from the primary winding 71 and the bars extend perpendicularly from the axis of the inner conductor 42 and transversely with respect to the long dimension of the center leg 62 of the transformer. The bars are bent to form a loop encircling the top, rear, bottom, and front of the primary 71. At approximately the one-turn point, the bars are positioned between the ends 73, 74 thereof and the primary 71, and are separated from each other and bent farther around the primary 71 so as to form a second turn which flanks the first turn on both sides. Near the end of the second turn, the bars are extended away from the primary 71 to a point beyond the ends 73, 74 from the primary 71, and continue to curve until the second turn is completed. Near the end of the second turn, the outer ends 76, 77 of the bars are bent somewhat together. Notches in each bar near the outer ends 76, 77 thereof are positioned to securely engage against the inner end of the outer conductor 41, and are fastened by soldering or the like.

Insulative discs 78, 79 may be positioned to maintain a spaced relationship among the primary 71, the ends 73, 74, and the ends 76, 77. Although two turns are preferred, any number of turns may be formed by the secondary winding, each turn comprising a pair of conductors flanking the preceding turn on both sides. Adjacent turns must be electrically insulated one from the other. The secondary winding 72 may be pre-formed and connected to the conductor 32, and then assembled as a unit onto the primary winding 71. A layer of heat-insulative material may be positioned around the windings to insulate the legs 63, 64 and frames 66, 67 from any heat which may occur in the secondary 72. The secondary 72 may be formed, if desired, from a single piece of material one-half of an inch wide and one-eighth of an inch thick and slit along a portion thereof to form flanking-turn portions having a cross-section area measuring one-fourth-by-one-eighth of an inch. Other sizes of secondary material may be used, depending upon the heat desired.

The essential desideratum regarding the secondary winding 72 is that the beginning and ending thereof must be in alignment on a common axis passing geometrically through the structure so that these ends may directly connect to inner and outer coaxially-aligned conductor members. Such a construction provides faster, more efficient heating of the tip 31.

It will be apparent that other types of cores may be employed which have a leg equivalent to the center leg 62. Certain shapes of cores, such as the "core-type" have two similar legs whereby the primary 71 may be positioned on one leg, and the secondary 72 may be positioned on another leg.

The handle 35 is preferably cylindrically-shaped and constructed from a body portion 80 made from insulative material such as fibre, and is attached to the rear frame 67 by means of screws or the like in axial alignment with the conductor 32 and transformer 34. A first switch 81 (preferably a single-throw type) and a second switch 82 (preferably a double-throw type), shown in exterior views, are positioned within the handle 35 and are supported by a bracket 83. A push-pin 84 is positioned to turn on the switch 81 when pushed, and extends radially through the wall of the handle body 80. A push-button 86 is positioned to actuate the switch 82 when pushed, and extends radially through the wall of the handle body 80.

A switch lever 87, preferably made from stainless steel and formed to have an elongated shape and transversely curved in accordance with the curvature of the handle body 80, is attached to the handle body in the vicinity of the push-button 86 by means of screws, rivets, or the like. An opening is provided in the lever 87 through which the push-button 86 extends and protrudes. The push-button 86 may be provided with a shoulder to prevent its accidental removal through said opening.

Notches 88, 89 are provided in the lever 87 near its end of attachment to provide flexibility thereat. The lever 87 extends away slightly from the handle body 80 at its other end, whereat a hook-shaped tab 91 extends into a recess 92 in the wall of the handle body 80 and functions to limit the maximum distance between the lever and handle. A portion of the lever 87 passes over the outer tip of the push-pin 84, so that when the lever is moved toward the handle, the switch 81 becomes turned on.

A plug 96 is positioned to close the end of the handle. An opening 97 through the plug accommodates the power cord. The electrical wires are not shown in Figure 3, in order to simplify the drawing. The electrical circuit wiring will be described hereinafter.

Now referring to the embodiment illustrated in Figures 10 through 14, wherein a cylindrical type of core is employed, the alternative working tip 31' comprises an inner cup-shaped member 102 positioned concentrically within an outer cup-shaped member 103 and having the closed ends thereof fastened together at a point of abutment 104 by any convenient means providing a low-resistance electrical connection such as spot-welding. The tip 31' may be made from copper or other suitable conductive material. The open ends of the inner and outer tip members 102 and 103, are threaded so that the tip may be screwed onto the inner and outer conductor members 42' and 41' which in this embodiment are shown as being provided with threads at their outer ends. A slit 106 may be formed in the tip to provide a resilient engagement of threads. If desired, the tip and conductor receptacle construction shown in Figures 3 and 9 may be employed.

The transformer 34' comprises a front housing member 106' which is attached to the outer conductor 41' or to the radiator 33 which in turn is attached to the outer conductor 41'. A rear housing member 107 is fastened to the front housing member 106' by means of threads as shown, or by other convenient means. The housing members 106' and 107 form a conductive housing within which a cylindrical magnetic core 61' is positioned in axial alignment with respect to the inner conductor 42', which inner conductor extends through the core and is fastened to the rear housing member 107 preferably by means of a screw 109 which also functions to secure a handle bracket 111 and a heat insulator plate 112 in position.

The primary winding 71' is positioned in a toroidal manner on the core 61'. The housing members 106' and 107, and the portion of the inner conductor 42' which extends within the housing, form the secondary winding 72' of the transformer 34'. Longitudinal slots 116 may be provided in the housing 106' to prevent circulating currents and to provide ventilation.

The handle 35 is attached to the handle bracket 111 by means of a force fit, or by screws or the like. The heat insulator plate 112 may contain an opening which fits concentrically on the handle bracket 111, and is secured in position by the rear housing member 107 and the handle 35. The rear housing member 107 and the handle bracket 111 are provided with openings 116' through which wires (not shown) may be placed to electrically connect the primary winding 71' to the switches 81 and 82.

Figure 15:
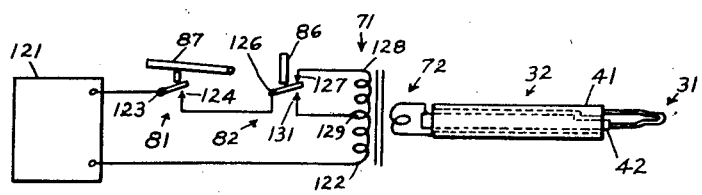
Figure 15 shows a preferred electrical wiring diagram of the invention.

Now referring to preferred electrical circuit connections shown in Figure 15, one terminal of an A.-C. voltage source 121 is connected to an end 122 of the primary winding 71. Another terminal of the source 121 is connected to a contact 123 of the switch 81. The remaining contact 124 of the switch 81 is connected to a common contact 126 of the switch 82. A normally-closed contact 127 of the switch 82 is connected to the remaining end 128 of the primary 71. A tap 129 on the primary 71, is connected to a normally-open contact 131 of the switch 82.

When the switch-lever 87 is depressed to turn on the switch 81, power is connected to the entire primary 71 and normal working heat is produced in the tip 31 by means of magnetic flux in the core. When the push-button 86 is depressed to actuate the switch 82 at the same time that the switch 81 is turned on, the power is connected to a portion of the primary 71, thereby decreasing the turns ratio between the primary 71 and the secondary 72. This decreased turns ratio causes greater current to flow in the secondary 72 which results in increased heating of the tip 31.

Figure 16:
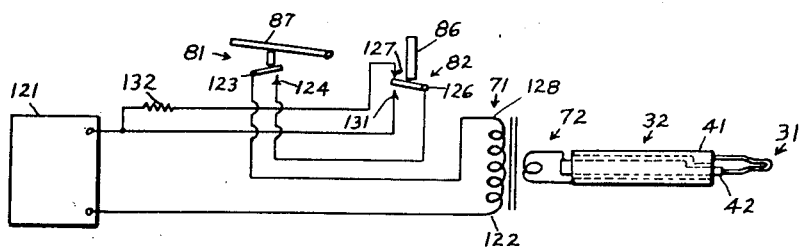
Figure 16 shows an alternative electrical wiring diagram of the invention.

In the alternative electrical circuit connections of Figure 16, one terminal of the source 121 is connected to the end 122 of the primary 71. The remaining terminal of the source 121 is connected to the normally-open contact 131 of the switch 82 and a resistance 132 to the normally-closed contact 127 of the switch 82. The common contact 126 of the switch 82 is connected to the contact 124 of the switch 81, from which the contact 123 is connected to the remaining end 128 of the primary 71. The resistance 132 may comprise resistive material incorporated in the power cord 36.

When the switch-lever 87 is depressed to turn on the switch 81, power is connected to the primary 71 through the resistance 132 which functions to limit the primary current to a value such as to produce a desired working heat in the tip 31. When the push-button 86 is depressed to actuate the switch 82 at the same time that the switch 81 is turned on, the power source is connected directly to the primary 71, thereby causing greater currents to flow in the primary 71 and secondary 72, which results in increased heating of the tip 31.

Figure 17:
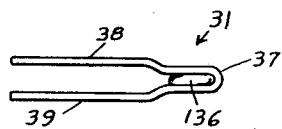

Now referring to the preferred embodiments of the working tip 31 shown in Figures 17 through 21, the embodiment of Figure 17 is constructed as has been described with reference to Figures 1, 2, and 3. When the tip is heated and solder is applied thereto, a lump 136 of molten solder forms between the closely-spaced working portions in the vicinity of the apex 37. It is believed that this lump 136 of solder forms because the working portions are so closely spaced that surface-tension of the solder is effective in causing the solder to bridge the small gap.

When the working portions of the heated tip 31 are applied to an object to be heated for soldering, the molten lump 136 of solder is useful because it serves to contact against said object over a relatively large surface area, even if the object has an irregular shape, thereby transferring heat more effectively to the object. When the tip 31 is cooled, the lump 136 of solder solidifies. When current is turned on in the tip thereby heating it, part of the current forms a shunt path through the lump 136 of solder, which shunt current is effective in heating the lump 136. Thus, the combined heat produced by the current flowing both in the tip material and in the lump 136, causes the lump to become molten, whereupon continuing currents through the tip and lump function to maintain the lump in a molten state. When the apex of the tip becomes worn thin, due to wear and corrosion, the solder lump insures continued effective heating and functioning of the tip, thereby extending the useful life of the tip.

Figure 18:
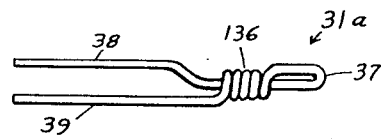

The tip 31a shown in Figure 18 is similar to the tip of Figure 17, except that a portion of the tip material forming one leg 39 is wound one or more turns around the remaining leg 38 to form a winding 136. This construction provides a greater heat-mass characteristic, since the mass or weight of the tip is increased. The winding 136 may be impregnated with solder, if desired, without adversely affecting the utility of the tip.

Figure 19:
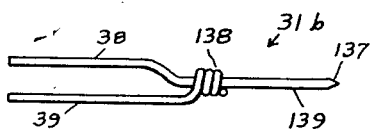

The tip 31b shown in Figure 19 is useful where a very small point is required. It is similar to that of Figure 18, except that a portion of the tip material has been removed near the apex 37, so that the tip comprises, essentially, one leg 38 an end of which forms a working point 137, and a leg 39 a portion of which is wound to form turns 138 around the leg 38 at a distance of, say, about one-half of an inch or more from the point 137. In operation, current flows from one leg 38 to the other leg 39, through an electrical path formed by the turns 138 abutting against the leg 38. To facilitate this electrical path, the turns 138 may be impregnated with solder. Heat is carried to the tip 137 by thermal conductivity along the shank 139.

Figures 20 and 21 show a tip construction similar to that of Figure 17, except that a plurality of tightly-wound loops or turns 141 are formed near the apex 37. This provides more weight of tip material and thus a greater heat-mass for heating relatively large objects.

In operation, the novel soldering tool may be rested, when not in use, on a bench with the power cord 36 connected to a suitable power source such as 115 volts A.-C. When it is desired to solder, the tool is picked up by its handle 35 whereupon the switch lever 87 is manually depressed and heating current flows in the tip 31. For faster heating, the push-button 86 is also manually depressed with a thumb or finger. It has been found that the tip 31 can reach operating temperature during the time the tool is picked up and applied to the object to be soldered; viz., about two seconds. While soldering, the push-button 86 may be depressed whenever greater heat is desired.

The tip constructions shown in Figures 1, 2, 3, 17, 18, 20, and 21, are particularly useful when soldering objects such as wire leads of resistors, condensers, and the like. While soldering or unsoldering, the ends of these wire leads may be hooked onto by the U-loop of the tip 31 and then bent into position or removed from a terminal, thereby accomplishing soldering and positioning of wires at the same time.

Since the working tip 31 may be made from wire, replacement tips are easily made into desired shapes and inserted into the tool. Since the heating element is visible, its condition is easily ascertained so that it may be replaced when it becomes worn or corroded. The working tip is thermally efficient since the surface thereof is directly heated by the passage of electric current.

Since the novel geometric construction permits the use of coaxial conductors 32, danger of accidentally short-circuiting the conductors is minimized because of the protective shielding effect of the outer conductor 41 on the inner conductor 42.

The geometrical construction comprises coaxial conductors and a transformer having a core, a primary winding, and a secondary winding, so arranged and constructed that mirror images occur along opposite sides of at least two minor axes transverse to and passing through any point on a major longitudinal axis passing through the conductors and transformer. In Figure 6, such minor axes are designated by the numerals 146 and 147; the top half of the vertical axis 146 is a mirror-image of the bottom half thereof; the left-hand portion of the horizontal axis 147 is a mirror-image of the right-hand portion thereof. Similar mirror-image axes 146' and 147' are shown in Figure 13. The geometric construction facilitates short, direct electrical connections between the secondary winding and conductor members, whereby electrical efficiency is improved.

While preferred embodiments have been described of the invention, various alterations and modifications thereof may be made by those skilled in the art, which will none-the-less fall within the spirit and scope of the present invention, as defined by the claims.

What is claimed is:

1. A soldering tool comprising in alignment on a common axis, a working tip adapted to be heated by the passage of current therethrough, an elongated pair of coaxially arranged straight current conductors one being positioned substantially concentrically within the other and each having an end thereof connected to said tip, a transformer having means for producing magnetic flux and having a current-generating secondary winding positioned in the field of said flux and connected directly across the remaining ends of said conductors, and a substantially tubular handle connected to said transformer, said soldering tool being characterized by geometrical symmetry about said axis through said handle, the portion of said pair of conductors adjacent said secondary winding, and said transformer in at least two mutually perpendicular planes passing through said axis, whereby said magnetic flux generates current in the entire length of said secondary winding.

2. The tool of claim 1, in which said tip comprises two cup-shaped conductive members positioned coaxially and having the closed ends thereof electrically attached together to provide a low-resistance electrical connection therebetween.

3. The tool of claim 1, in which said working tip comprises two connector legs, the inner one of said coaxial conductors being provided with a shoulder at the first-named end thereof, said shoulder having a cross-section area less than that of said inner conductor, a first opening positioned longitudinally in the end of said shoulder to receive one of said connector legs, a thickened portion in the outer one of said coaxial conductors in the vicinity of said shoulder, and a second opening positioned longitudinally in said thickened portion of said outer conductor member to receive the other of said connector legs.

4. The tool of claim 1, in which said transformer comprises a shell-type core having a center leg, a primary winding positioned on said leg, said secondary winding being positioned over said primary winding and comprising an elongated conductive member having an end thereof connected to one of said pair of conductors, said elongated member forming a plurality of turns around said primary with the first of said turns extending substantially around the center of said primary, and the second of said turns being positioned outside said first turn to flank said first turn on both sides thereof, the remaining end of said elongated member being connected to the other one of said pair of conductors.

5. The tool of claim 1, in which said handle comprises a hollow tubular body portion, a first heat switch positioned within said body portion and having an actuating means extending through the wall of said body portion, and a switch-lever positioned on the outer surface of said body portion to actuate said actuating means when depressed.

6. The tool of claim 5, in which a second heat switch is positioned within said handle body portion and an actuating means therefor extends through the wall of said body portion.

7. A soldering tool comprising a working tip having two connector legs, an outer tubular current conductor, an inner current conductor positioned coaxially therein and having a shoulder at an end thereof having a cross-section area less than that of said inner conductor, a first receptacle in said shoulder to receive one of said connector legs, a thickened portion in said outer conductor in the vicinity of said shoulder, and a second receptacle in said thickened portion to receive the remaining said connector leg.

8. A soldering tool comprising a working tip having a first connector leg and a second connector leg, a current conductor having an outer conductor member and an inner conductor member positioned coaxially therein, said inner member being provided with a shoulder having a cross-section area less than that of said inner conductor and having a first opening positioned longitudinally therein to receive said first connector leg and having a slit in said shoulder along and through said opening to provide resilient engagement between said shoulder and said first connector leg, and said outer member having a thickened portion in the vicinity of said shoulder, said thickened portion containing a second opening positioned longitudinally therein to receive said second connector leg.

9. A soldering tool comprising a transformer having a core, a primary winding positioned to induce magnetic flux in said core, and a secondary winding positioned to have current produced therein by said flux, said secondary winding comprising a pair of elongated conductive members shaped to form a plurality of turns, said members being joined together to form an end of said secondary winding and being bent to form a first one of said turns, said members being spread apart at the end of said first turn and bent to form a second one of said turns placed outside of and flanking the first turn.

10. A soldering tool comprising a tubular handle, a working tip, means connected to support said tip from an end of said handle, electrical heating means comprising a transformer connected to said tip, a first switch positioned in said handle and electrically connected to said heating means, a switch lever positioned on the outside of said handle and extending substantially along the length thereof and adapted to actuate said first switch when said handle is gripped, a second switch positioned within said handle and having a common terminal, a normally closed terminal and a normally open terminal, a push-button positioned on said handle near said end thereof and adapted to actuate said second switch when pressed, a two-terminal source of voltage, a primary winding in said transformer having one end thereof connected to a terminal of said source of voltage and another end thereof connected to the normally closed terminal of said second switch, a tap on said primary winding connected to the normally open terminal of said second switch, an electrical connection between said common terminal and a terminal of said first switch, and an electrical connection between the remaining terminal of said first switch and the remaining terminal of said source of voltage.

11. A soldering tool comprising a hollow tubular handle, a transformer connected to an end of said handle, a first switch positioned within said handle and having a pair of normally-open terminals, a switch lever positioned on the outside of said handle and extending substantially along the length thereof and adapted to actuate said first switch when said handle is gripped, a second switch positioned within said handle and having a common terminal, a normally closed terminal and a normally open terminal, a push-button positioned on said handle near said end thereof and adapted to actuate said second switch when pressed, a two-terminal source of voltage, a primary winding in said transformer having an end thereof connected to a terminal of said source of voltage and another end thereof connected to one of said pair of terminals, an electrical connection between the remaining one of said pair of terminals and said common terminal, an electrical connection between said normally open terminal and the remaining terminal of said source of voltage, and a resistor connected between said normally closed terminal and said remaining terminal of said source of voltage.

12. A soldering tool comprising a hollow tubular handle, a transformer positioned at an end of said handle, a first switch positioned within said handle and connected in the electrical circuit of said transformer, a switch lever having an end portion thereof attached to said handle near said end of said handle, the remaining portion of said switch lever extending away from said handle, means connecting said last-named portion of the switch lever with said switch to cause said switch to be actuated when said handle is gripped, a second switch positioned within said handle and connected in the electrical circuit of said transformer, and a push-button extending through said end portion of said switch lever and adapted to actuate said second switch.

13. A soldering tool as claimed in claim 1, in which said transformer comprises a hollow cylindrical core aligned on said axis, said secondary winding comprising in part a portion of the inner one of said straight current conductors which extends entirely through the hollow of said core, the remaining part of said secondary winding comprising a cup-shaped electrically conductive member attached electrically to the end of the extended portion of said inner conductor near one end of said core and extending around and substantially surrounding said core and attached electrically to the outer one of said straight current conductors near the other end of said core.

References Cited in the file of this patent

UNITED STATES PATENTS

| Re. 23,619 | Weller | Feb. 10, 1953 |
|---|---|---|
| 287,380 | Hughes | Oct. 23, 1883 |
| 445,648 | Cannell | Feb. 3, 1891 |
| 566,545 | Synder et al | Aug. 25, 1896 |
| 738,594 | Ayer | Sept. 8, 1903 |
| 1,096,475 | Van Glahn | May 12, 1914 |
| 1,593,029 | Pagliarul | July 20, 1926 |
| 1,684,143 | Pieper et al. | Sept. 11, 1928 |
| 2,106,439 | Schubert | Jan. 25, 1938 |
| 2,243,086 | Buettell | May 27, 1941 |
| 2,359,393 | Sloan | Oct. 3, 1944 |
| 2,381,077 | Obszarny | Aug. 7, 1945 |
| 2,405,866 | Weller | Aug. 13, 1946 |
| 2,485,340 | Warmey | Oct. 18, 1949 |
| 2,544,326 | Jones | Mar. 6, 1951 |
| 2,558,192 | Nockunas | June 26, 1951 |
| 2,560,552 | Caliri | July 17, 1951 |
| 2,570,762 | Caliri | Oct. 9, 1951 |
| 2,593,947 | Weller | Apr. 22, 1952 |
| 2,605,379 | McKay | July 29, 1952 |
| 2,619,576 | Greibach | Nov. 25, 1952 |
| 2,671,845 | Chromy | Mar. 9, 1954 |

FOREIGN PATENTS

| 77,584 | Norway | Oct. 16, 1950 |
|---|---|---|
| 229,881 | Great Britain | Mar. 5, 1925 |
| 267,162 | Switzerland | June 1, 1950 |
| 420,921 | Italy | May 9, 1947 |
| 424,218 | Italy | Aug. 8, 1947 |
| 534,314 | Great Britain | Mar. 4, 1941 |
| 787,065 | France | Sept. 16, 1935 |